United States Patent
Mooney

[11] 3,806,292
[45] Apr. 23, 1974

[54] MOLDING APPARATUS
[75] Inventor: William D. Mooney, Conshohocken, Pa.
[73] Assignee: Cardinal Engineering Corporation, Conshohocken, Pa.
[22] Filed: Aug. 10, 1972
[21] Appl. No.: 279,483

[52] U.S. Cl. .......... 425/186, 425/182, 425/450
[51] Int. Cl. .......... B29c 1/16, B29c 1/14
[58] Field of Search .......... 425/195, 255, 344, 357, 425/438, 444, 450, 810, 186; 264/325

[56] References Cited
UNITED STATES PATENTS
2,073,590  3/1937  Sanford .......... 264/112
2,137,986  11/1938  Sanford .......... 264/325 X
2,703,437  3/1937  Lindblad .......... 264/325 X
3,599,283  8/1971  Budai .......... 425/3 X
3,687,591  8/1972  Perego .......... 425/444

Primary Examiner—Robert L. Spicer, Jr.
Attorney, Agent, or Firm—Seidel, Gonda & Goldhammer

[57] ABSTRACT

Molding apparatus is adapted to form in a single molding operation a plurality of abrasive discs or like articles. A three-cavity mold is exemplified comprising separately reciprocable mold ring and composite mold plate means.

10 Claims, 10 Drawing Figures

PATENTED APR 23 1974 3,806,292

3,806,292

MOLDING APPARATUS

This invention relates to apparatus for molding abrasive discs or like articles, concerning especially multicavity molding apparatus.

Molding apparatus capable of forming an abrasive disc or like article in a complete molding operation is known, such as that disclosed in U.S. Pat. No. 3,599,283, which is incorporated herein by this reference. Nevertheless, increased productivity is desirable, as is improved construction of the mold parts, in the interest of economy in production of such articles.

A primary object of the present invention is provision of molding apparatus adapted to form a plurality of abrasive discs or like articles in a single molding cycle.

Another object is improved mold-plate structure comprsing a plurality of component parts.

A further object is increased economy of manufacture by means of such improved molding apparatus.

Other objects of the present invention, together with means and methods for attaining the various objects, will be apparent from the following description and the accompanying diagrams of a preferred embodiment of the invention, which is presented by way of example rather than limitation.

In general, the objects of the present invention are accomplished, in apparatus for molding abrasive discs or like articles, including relatively reciprocable cavity-defining mold plate and surrounding ring means, by means of plural cavity mold means. Such mold means comprises a laterally segmented base plate, a plurality of laterally segmented top plates carried by the base plate, each top plate bridging spaced segments of the base plate, and ring means laterally surrounding each of the top plates and thereby defining a plurality of molding cavities when the plates are reciprocated to locate the upper surfaces of the top plates within the ring means.

Preferably included in such apparatus of this invention is a like plurality of laterally segmented intermediate plates segmentally aligned with and carried by the base plate and carrying the top plates, each top plate bridging the segments of one adjacent intermediate plate. Also preferably included is spider and spindle means secured with the ring means above the base plate and having a plurality of arms registering between segments of the intermediate and base plates during reciprocation of the plates and having also an equal plurality of spindles upstanding from the respective arms and registering with the bores in the respective top plates.

Figure 1:
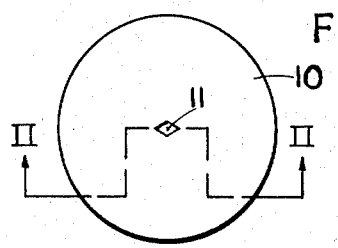
FIG. 1 is a plan view of a mold top plate according to this invention.
Figure 2:
FIG. 2 is a side sectional elevation of the plate of FIG. 1, taken at II—II thereon.

FIG. 1 shows in plan, and FIG. 2 in sectional elevation, disclike top plate 10, which has diamond-shaped central bore 11 therethrough and four threaded blind bores 12 (two visible in FIG. 2) evenly spaced in the underside to receive screw means for securing each top plate to an underlying supporting plate. (Such a "top" plate is actually the topmost mold member for supporting a charge of material to be compressed and should not be confused with an overlying pressure plate functioning to confine or compress the material for molding, as in a press, wherein this top plate would constitute a bottom plate relative to molding compression).

Figure 3:
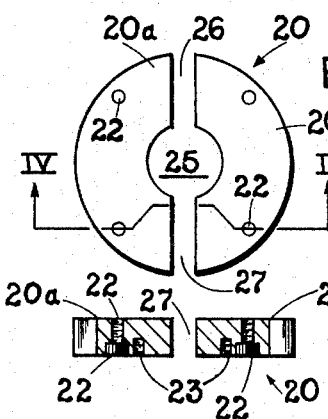
FIG. 3 is a plan view of a segmented intermediate plate for securing the top plate or the preceding views to a supporting base plate.
Figure 4:
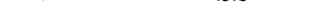
FIG. 4 is a side sectional elevation of the segmented plate of FIG. 3, taken at IV—IV thereon.

FIGS. 3 and 4 show, in plan and side sectional elevation, respectively, segmented disclike intermediate plate 20, which is made up of two generally semicircular segments 20a and 20b laterally spaced apart from one another and dimensioned so that the diameter of the pair approaches but does not exceed that of top plate 10 in FIG. 1. The midportion of the straight edge of each segment is hollowed arcuately to provide generally circular opening 25 communicating with flanking slots 26, 27 provided by the spacing of the segments. Bores 22 through the respective segments (one pair in each of the two segments) are located for alignment with blind bores 12 of the top plate and are counterbored from the under side to receive appropriate screwheads. Also present in each segment are threaded blind bores 23 in the under side (one visible each in FIG. 4) to receive screw means for securing the intermediate plate segments to a base plate.

Figure 5:
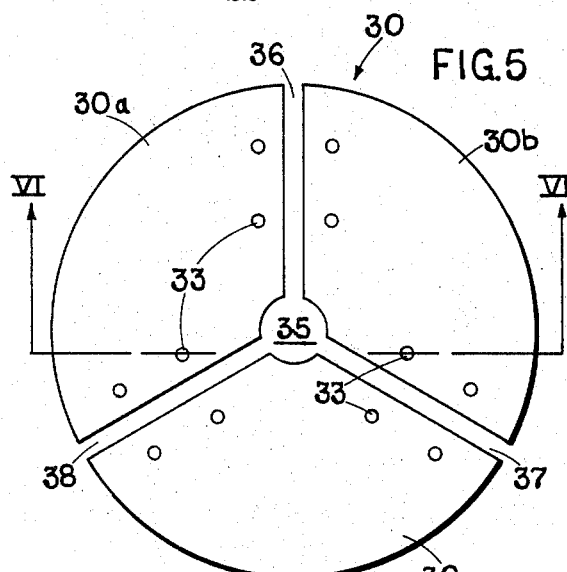
FIG. 5 is a plan of a trebly segmented base plate for supporting a plurality of top plates of the preceding views.
Figure 6:
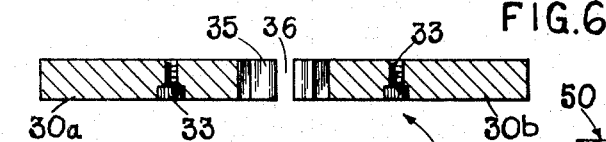
FIG. 6 is a side sectional elevation of the segmented base plate of FIG. 5, taken at VI—VI thereon.

FIGS. 5 and 6 show, in plan and sectional elevation, disclike segmented base plate 30 made up of three identical pieces 30a, 30b, and 30c spaced laterally apart equally about a common center, providing slots 36, 37, and 38 between respective adjacent segments. Central opening 35 is provided by arcuate hollowing of the inner edges of the respective segments. Each base plate segment has two pairs of bores 33 therethrough, counterbored from the under side, for alignment with blind bores 22 in the intermediate plates. Each base plate segment is so adapted to carry two intermediate plate segments, one from each of two segment pairs, with the slots between adjacent intermediate plate segments aligned with one or another of the slots between adjacent base plate segments. Thus, the base plate is adapted to carry three top plates 10 evenly spaced about the base plate center.

Figure 7:
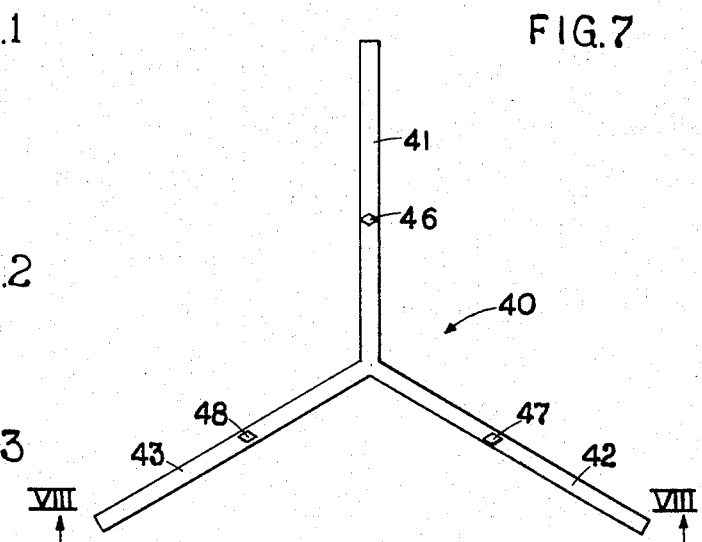
FIG. 7 is a plan view, partly broken away, of spider and spindle means for registering with the foregoing mold means.
Figure 8:
FIG. 8 is a side elevation of the spider and spindle means of FIG. 7, taken at VIII—VIII thereon.

FIGS. 7 and 8 show, in plan view and in elevation, spider and spindle means 40 having three identical spider arms 41, 42, and 43 extending horizontally outward equiangularly and carrying respective upstanding spindles 46, 47, and 48 similar in cross-section to, but slightly smaller than, diamond-shaped bores 11 in top plates 10. The spindles are located for registration with those bores, and the arms are arranged for registration with the respective slots between the spaced intermediate and base plate segments.

Figure 9:
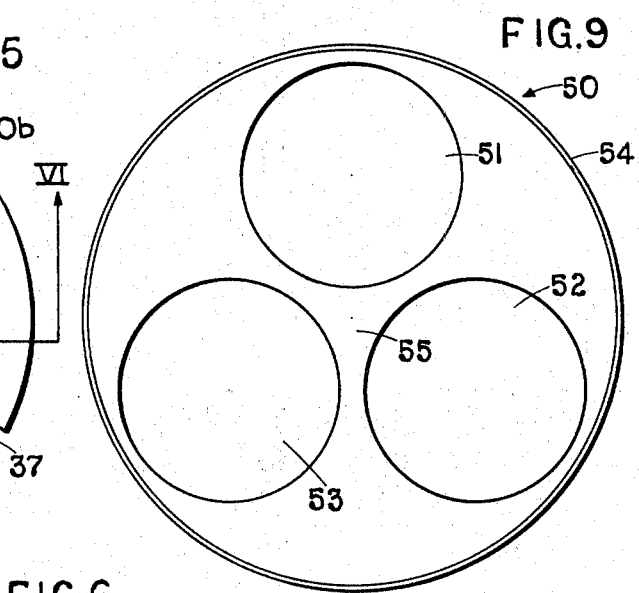
FIG. 9 is a plan of mold ring means for use with the mold plate components of the preceding views.

FIG. 9 shows, in plan, mold ring means 50 having evenly spaced circular openings 51, 52, and 53 therethrough spaced about web 55 thereof and each adapted to receive therein the top (and intermediate) mold plates of the preceding views, each such opening being slightly larger in diameter than top plates 10, which are centered relative thereto. The peripheral edge of the ring means is enlarged by band 54 of slightly greater diameter intermediate the upper and lower edges. The ring means is fixed in position relative to spider and spindle means 40 of FIG. 7 and 8 and is reciprocable therewith also (by support means, not shown) relative to the plate means of the previous views, secured together by appropriate screw means.

Figure 10:
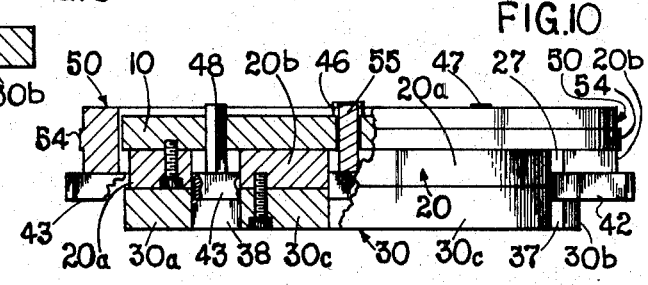
FIG. 10 is a side elevation, partly in section, of the same mold ring and plate means assembled to one another.

FIG. 10 shows the mold plate and surrounding ring means, together with the spider and spindle means, already shown and described, as assembled relative to one another. The view is partly in elevation and partly sectioned or cut away for clarity of the showing. The respective plates are secured together with appropriate screw means in their threaded openings previously considered. The upper surfaces of top plates 10 (one clearly visible in section) are recessed somewhat relative to the top edge of mold ring means 50. It will be understood that the extent of such recessing determines the thickness of abrasive mix laid into the plural cavities so defined: the greater the recessing, the thicker the layer of mix—which is compressed subsequently into an even thinner layer.

Successive operating positions of molding apparatus of the present invention, including the foregoing components appropriately assembled as aforesaid, are readily visualizable, especially with the aid of already mentioned U.S. Pat. No. 3,599,283. The respective positions are identifiable as filling, initial and final molding, and stripping positions. A first reciprocating means carries the spider and spindle means and the mold ring means fixed relative to one another, while a second, independently reciprocating means carries the assembled plate components thereon. Suitable first and second such means are illustrated and described in the mentioned patent: as identified therein such first reciprocating means comprises "supporting ring 82 that can be moved up and down under the control of three fluid pressure cylinders 83" upon whose pistons the ring is carried, and the second such supporting means comprises "a piston 73 carrying an electromagnetic plate 74" that can be secured to the plate assembly and "be moved up and down by fluid pressure."

In the filling position the top face of the mold ring means conveniently fits flush with the top of a surrounding table (not shown herein) having a circular opening therethrough to accommodate the mold ring means. The top face of respective top plates is somewhat lower than in FIG. 10 so as to form recesses to be filled by an abrasive molding mix, with or without suitable reinforcing means such as glass fabric blanks centered on the respective spindles. The actual filling operation may be performed as described and shown in the mentioned patent or in any other suitable manner, even manually.

In the initial molding position the entire mold means has been removed to a suitable press (not shown herein), the mold ring means having been lowered to clear the table, and the entire assemblage preferably lowered still further to facilitate insertion into the press. A pressure plate of a suitable ram lowers and meets the top face of the mold ring means and depresses it. In the final molding position, the pressure plate has forced the mold ring means downward relative to the mold plate means, which does not lower quite so much, sufficiently to compress the abrasive fill in each of the molding cavities outlined by openings 51, 52, and 53 therein.

In the stripping position, the mold ring means is returned to the opening in the surrounding table, and the top plate assemblage is raised somewhat above the table top. The increase in plate level is sufficient to withdraw the spindles into the central bores of the top plates, thereby facilitating removal of the molded abrasive structures, which are subsequently heated and thereby cured into permanent solid shape.

The composite mold means of the present invention permits ready replacement of the relatively thin top plates, which undergo most of the wear. Another benefit is ready conversion to different pluralities of molding cavities without removal of the external plate support, by substitution of matching multi-cavity molding means and spider and spindle means.

Although only a three-cavity arrangement has been shown and described, it will be apparent that four, six, or other number of cavities could be accommodated in like manner. Moreover, it is also possible to add, combine, or subdivide parts or steps, or to substitute equivalents, while retaining at least some of the benefits of the present invention, which itself is defined in the following claims.

The claimed Invention:

1. In apparatus for molding abrasive discs or like articles, including mold means having relatively reciprocable cavity-defining mold plate means and cooperating ring means laterally surrounding at least part of the mold plate means, the improvement comprising plural cavity mold means wherein the mold plate means includes a laterally segmented base plate, and a plurality of top plates carried thereby, each top plate bridging and being secured to two segments of the base plate.

2. Molding apparatus according to claim 1, wherein the top plates are essentially circular discs, and the ring means laterally surrounds each of the top plates and thereby defines therewith a plurality of molding cavities when the plates are reciprocated to locate the upper surfaces of the top plates within the ring means.

3. Molding apparatus according to claim 1, including a plurality of laterally segmented intermediate plates segmentally aligned with and carried by the base plate, the intermediate plates being secured to the base plate and carrying the top plates, each top plate bridging and being secured to the segments of one adjacent intermediate plate.

4. In apparatus for molding abrasive discs or like articles, including mold means having relatively reciprocable cavity-defining mold plate means and cooperating ring means laterally surrounding at least part of the mold plate means, the improvement comprising plural cavity mold means wherein the mold plate means includes a laterally segmented base plate, and a plurality of top plates carried thereby, each top plate bridging two segments of the base plate and being secured thereto, including a plurality of laterally segmented intermediate plates segmentally aligned with and carried by the base plate, the intermediate plates being secured to the base plate and carrying the top plates, each top plate bridging and being secured to the segments of one adjacent intermediate plate, including also spider means secured with the ring means above the base plate and having a plurality of arms registering between segments of the intermediate and base plates during reciprocation of the plates.

5. Molding apparatus according to claim 4, wherein each of the top plates has a central bore therethrough, and the spider means has a like number of spindles upstanding from its arms and registering with the respective bores.

6. Apparatus for molding abrasive discs or like articles, comprising separately reciprocable mold plate means and mold ring means defining a plural-cavity mold, the mold ring means comprising a shallow cylindrical ring member having a plurality of cylindrical openings therethrough and comprising also a spider member underlying the ring member and adapted for vertical movement therewith, the mold plate means comprising a segmented base plate having a plurality of segments laterally spaced apart, a like plurality of segmented intermediate plates each having a pair of laterally spaced segments secured to the base plate, the spaces left by the spacing of segments being traversable by the spider member, and a like plurality of top plates respectively coextensive laterally with the plurality of openings in the ring member and being secured to and bridging segments of the respective intermediate plates.

7. Molding apparatus according to claim 6, wherein the top plates are of equal diameter and are equally spaced laterally about the central axis of the ring member, whose cylindrical openings are spaced likewise to register therewith.

8. Molding apparatus according to claim 7, wherein the spider member includes an upstanding spindle centered axially relative to each such opening, and each such top plate has a central bore registrable therewith.

9. Molding apparatus according to claim 8, wherein there are three such top plates, of identical dimensions.

10. Molding apparatus according to claim 9, wherein the spider member has three arms extending laterally as 120° to one another from a common center, each arm carrying such a spindle.

* * * * *